ary of the Federal Republic of Germany, and is an American Patent application filed Sep. 24, 1986.

United States Patent [19]
Woerner et al.

[11] Patent Number: 4,666,948
[45] Date of Patent: May 19, 1987

[54] PREPARATION OF RESILIENT MELAMINE FOAMS

[75] Inventors: Frank P. Woerner, Wachenheim; Peter Neumann, Wiesloch; Harald Mahnke, Ludwigshafen; Josef Lamprecht, Frankenthal; Dieter Horn, Heidelberg; Gerhard Turznik, Ludwigshafen; Friedrich Kraus, Bensheim; Hanshelmut Kaeppel, Weinheim; Eduard Heim, Worms, all of Fed. Rep. of Germany

[73] Assignee: BASF Aktiengesellschaft, Fed. Rep. of Germany

[21] Appl. No.: 910,971

[22] Filed: Sep. 24, 1986

[30] Foreign Application Priority Data

Sep. 28, 1985 [DE] Fed. Rep. of Germany ....... 3534738

[51] Int. Cl.$^4$ .................................................. C08J 9/14
[52] U.S. Cl. ...................................... 521/105; 521/85; 521/89; 521/97; 521/107; 521/121; 521/124; 521/125; 521/130; 521/187
[58] Field of Search ................ 521/85, 89, 97, 105, 521/107, 121, 124, 125, 130, 187

[56] References Cited

U.S. PATENT DOCUMENTS

| | | | |
|---|---|---|---|
| 3,238,155 | 3/1966 | Harrell et al. | 521/187 |
| 4,192,923 | 3/1980 | Tajkowski | 521/187 |
| 4,334,971 | 8/1982 | Mahnke et al. | 204/159.21 |
| 4,336,170 | 6/1982 | Horiike et al. | 521/187 |
| 4,390,643 | 6/1983 | Kanada et al. | 521/187 |
| 4,511,678 | 4/1985 | Mahnke et al. | 521/52 |
| 4,540,717 | 9/1985 | Mahnke et al. | 521/187 |

FOREIGN PATENT DOCUMENTS

| | | | |
|---|---|---|---|
| 17671 | 10/1980 | European Pat. Off. | |
| 37470 | 10/1981 | European Pat. Off. | |
| 53441 | 12/1984 | European Pat. Off. | 61/20 |

*Primary Examiner*—Morton Foelak
*Attorney, Agent, or Firm*—Keil & Weinkauf

[57] ABSTRACT

Resilient foams based on melamine resins are prepared by foaming an aqueous solution which contains a melamine/formaldehyde precondensate, an emulsifier, a volatile blowing agent and a curing agent and then curing the foam. In this process, from 0.2 to 4% by weight of an alkali metal, alkaline earth metal or aluminum salt of an organic, preferably polybasic acid, of a polyphosphoric acid or of a boron acid are added to the aqueous solution.

4 Claims, No Drawings

PREPARATION OF RESILIENT MELAMINE FOAMS

The present invention relates to a process for the preparation of melamine resin foams possessing high resilience.

EP-A-No. 17 671 (U.S. Ser. No. 400,050) describes a process for the preparation of melamine resin foams, in which a concentrated aqueous solution which contains a melamine/formaldehyde precondensate, an emulsifer, a volatile blowing agent, a curing agent and, if required, further additives is foamed under conditions such that there is initially only a slight increase in viscosity and the curing process takes place, accompanied by a sharp increase in viscosity, only when the foaming process is substantially complete. Although this process gives foams which are more resilient than the previously known melamine resin foams, they are still too brittle for many intended uses.

According to EP-A-No. 37 470 (U.S. Pat. No. 4,334,971), the melamine resins used for foam production are supposed to contain sulfite groups as condensed units. However, such foams are very sensitive to hydrolysis and possess low light stability and heat stability. The same applies to foams which have been prepared according to EP-A-No. 17 671 with the addition of hydrogen phosphates as curing agents. EP-A-No. 53 441 states that ammonium salts are added as curing agents during the preparation of fibers or foams from aminoplast resins. In the case of melamine resin foams, however, ammonium salts produce an extremely fine-cell structure and hence very brittle foams.

It is an object of the present invention to provide a process for the preparation of melamine resin foams possessing high resilience, little sensitivity to hydrolysis and good stability to the effect of light and heat.

We have found that this object is achieved, according to the invention, if from 0.2 to 4% by weight of an alkali metal, alkaline earth metal or aluminum salt of an organic acid, of a polyphosphoric acid or of a boron acid are added to the aqueous solution of the melamine/formaldehyde precondensate to be foamed.

It is assumed that the added salts facilitate separation of the aqueous solution of the condensing melamine resin into an aqueous phase and a resin phase and thus help to form and stabilize cell webs at the correct time, these webs being responsible for the resilience of the foam. However, it is surprising that only the claimed salts are effective and not all electrolytes generally, and that particularly resilient foams are formed when special salt combinations are added.

The type and amount of starting materials and the conditions under which foaming and curing are carried out are described in detail in EP-A-No. 17 671, which is hereby incorporated by reference.

According to the invention, from 0.2 to 4, preferably from 0.3 to 3, % by weight, based on the precondensate, of a salt are added to the aqueous solution. Effective salts are those of monobasic organic acids, eg. sodium formate and sodium acetate, but preferably those of polybasic organic acids, eg. sodium oxalate and tartrate, sodium and potassium citrate, sodium nitrilotriacetate and sodium ethylenediaminetetraacetate. Particularly effective salts are those of polymeric organic acids, eg. sodium polyacrylate, the sodium salt of a copolymer of 70% by weight of acrylic acid and 30% by weight of maleic acid, calcium ligninsulfonate and gelatine (a calcium salt of a condensate of various amino acids), as well as sodium tripolyphosphate, sodium metaborate, calcium metaborate, borax and bentonite.

Combinations of

A. an alkali metal, alkaline earth metal or aluminum salt of a polybasic organic acid, of a polyphosphoric acid or of a boron acid and B. an alkali metal or alkaline earth metal salt of an organic acid or of an oxyacid of sulfur, of phosphorus or of boron, where the acid or salt B has a lower basicity than the acid of salt A, are preferred, the weight ratio A:B being from 10:90 to 50:50.

Suitable salts A are the abovementioned salts of polybasic acids, suitable salts B are likewise the abovementioned salts, as well as salts of oxyacids of sulfur, such as sodium and potassium sulfate, potassium disulfate or sodium sulfite, and of phosphorus, such as sodium and potassium phosphate, disodium hydrogen phosphate or potassium diphosphate. It is important that the acid has a lower basicity in the case of salt B than in the case of salt A. For example, a salt A of a dibasic acid, eg. borax, may be combined with a salt B of a monobasic acid, eg. sodium formate, or a salt A of a polybasic acid, eg. calcium metaborate, may be combined with a salt of a tribasic acid, eg. potassium phosphate. Combinations of from 0.1 to 1% by weight of an alkali metal salt of a polymeric acid with from 0.5 to 2.5% by weight of an alkali metal salt of formic acid are particularly preferred.

In the Examples, parts and percentages are by weight.

The following methods of measurement were used:

(a) Ram pressure measurement (mechanical quality test)

Specimens measuring $25 \times 25 \times 10$ cm are indented, in the direction of foaming, with a ram which has a diameter of 25 mm, a spherical cap radius of 40 mm and an edge radius of 2 mm and which meets the specimen surfaces at an angle of 75°, until tearing occurs; the tearing force is determined as a measure of the mechanical quality of the foam.

(b) Stability to hydrolysis

Foam specimens are stored in a conditioned chamber at 90° C. and 90% relative humidity.

(c) Heat stability

Foam specimens are stored for 24 hours at 240° and 270° C. They must withstand at least the test at 240° C. without significant deterioration of the edge stability (checked by rubbing firmly with the thumb).

EXAMPLES

A solution was prepared from 5 parts of water,
6.5 parts of 75% strength formic acid,
0.2 part of basic copper carbonate,
7.0 parts of sodium salt of a mixture of $C_{12}$–$C_{18}$-alkylsulfonic acids (40% strength in water) and
2.0 parts of the sodium salt of sulfated isooctylphenol reacted with 25 moles of ethylene oxide (35% strength in water).

50 parts of pentane were emulsified in this solution.

240 parts of a melamine/formaldehyde precondensate (molar ratio 1:3) were made into a paste with 60 parts of water, 3 parts of sodium formate and, in two batches, 1 part of sodium tripolyphosphate or sodium polyacrylate (50% strength in water).

The aqueous emulsion was homogeneously mixed with the precondensate paste in a mixer, the mixture was foamed in a hot air oven at 150° C. and the foam was then heated for 30 minutes at 230° C.

The foams obtained have a density of 12 g/l, they are stable to hydrolysis for more than 6 weeks and they withstand the 24 hour heat stability test without significant deterioration in the mechanical quality. The values for the ram pressure measurement are:

| Salt added | Indentation force [N] |
| --- | --- |
| Na tripolyphosphate | 43 |
| Na polyacrylate | 41 |

We claim:

1. A process for the preparation of a resilient foam based on a melamine resin by foaming an aqueous solution which contains a melamine/formaldehyde precondensate, an emulsifier, a volatile blowing agent and a curing agent and, if required, conventional additives, and then curing the foam, wherein from 0.2 to 4% by weight, based on the precondensate, of an alkali metal, alkaline earth metal or aluminum salt of an organic acid, of a polyphosphoric acid or of a boron acid are added to the aqueous solution.

2. A process as claimed in claim 1, wherein a salt A of a polybasic acid, preferably of a polymeric acid, is used.

3. A process as claimed in claim 2, wherein a combination of a salt A of a polybasic acid with an alkali metal or alkaline earth metal salt B of an organic acid or of an oxyacid of sulfur, of phosphorus or of boron, the acid of salt B having a lower basicity than the acid of salt A, is used in a weight ratio A:B of from 10:90 to 50:50.

4. A process as claimed in claim 3, wherein a combination of from 0.1 to 1% by weight of an alkali metal salt of a polymeric acid with from 0.5 to 2.5% by weight of an alkali metal salt of formic acid is used, the percentages being based on the precondensate.

* * * * *